United States Patent
Wales

Patent Number: 5,598,792
Date of Patent: Feb. 4, 1997

[54] CREDIT CARD SECURITY DEVICE HAVING CARD INVALIDATING ELECTROMAGNET

[76] Inventor: Forrest A. Wales, 2750 Cheyenne Dr., Grand Junction, Colo. 81503

[21] Appl. No.: 370,378

[22] Filed: Jan. 9, 1995

[51] Int. Cl.$^6$ .................................................. E05G 1/14
[52] U.S. Cl. ........................ 109/23; 109/41; 109/42; 235/486
[58] Field of Search ................... 235/486; 109/41, 109/42, 23

[56] References Cited

U.S. PATENT DOCUMENTS

| | | | |
|---|---|---|---|
| 4,722,435 | 2/1988 | Mareels et al. | 109/41 |
| 4,804,826 | 2/1989 | Hertzen et al. | 235/380 |
| 4,852,502 | 8/1989 | Klingberg et al. | 109/41 |
| 4,942,831 | 7/1990 | Tel | 109/42 |

FOREIGN PATENT DOCUMENTS

| | | | |
|---|---|---|---|
| 2379687 | 10/1978 | France | 109/42 |
| 2387344 | 12/1978 | France | 109/42 |
| 2634039 | 1/1990 | France | 235/486 |
| 2645318 | 10/1990 | France | 235/486 |
| 2651592 | 3/1991 | France | 235/486 |
| 58-105381 | 6/1983 | Japan | 235/486 |

OTHER PUBLICATIONS

Preliminary search results (see attached).

*Primary Examiner*—John Shepperd
*Attorney, Agent, or Firm*— Chase & Yakimo

[57] ABSTRACT

A credit card security device which prevents credit card and bank card fraud. The device includes a case with an access door secured by a lock for storing the cards and a detection member within the case for determining an entry into the case when the door is locked. The detection member operates an electromagnet within the case upon the entry. The electromagnet scrambles the code within each credit card's magnetic strip and thereby invalidates the credit cards for future use. The detection member comprises a normally open electrical circuit when the door is closed and locked and includes switches for providing a current flow to the invalidating electromagnet upon the entry. At least one such switch is a normally open pressure switch mounted in wall of the case which closes when the entry to the case is through the wall, thereby providing the current flow to the electromagnet. Another switch is associated with the lock and is open when the lock is unlocked, thereby precluding a current flow through the circuit, and which closes if the door is forcibly opened while locked, thereby providing the current flow to the electromagnet.

12 Claims, 9 Drawing Sheets

CREDIT CARD SECURITY DEVICE HAVING CARD INVALIDATING ELECTROMAGNET

FIELD OF THE INVENTION

This invention relates to a device for protecting credit cards and bank cards. Specifically, the device includes a secure wallet size case for carrying the cards and an electromagnetic invalidation system which scrambles the code within each card's magnetic strip upon unauthorized opening of the case and thus, renders the cards useless.

BACKGROUND OF THE INVENTION

Consumers are vulnerable to credit card and bank card fraud when a card is lost or stolen. Often the card cannot be cancelled quickly enough or the owner does not realize the card is missing until after the unauthorized use of the card. Although methods for preventing credit card and bank card fraud, such as applying a photograph of the owner or a reflection hologram to the card or assigning a PIN number to the card, have been developed, the most effective method for preventing the fraud is to invalidate the stolen or lost card preventing its use altogether. However, no known devices achieve this result.

SUMMARY OF THE INVENTION

Accordingly, it is a primary object of the present invention to provide a credit card security device having a secure case for holding credit and bank cards which upon the unauthorized opening thereof invalidates the cards for future use.

A further object of the present invention is to provide a credit card security device which invalidates the cards through the use of an electromagnet activated by a broken lock or pressure change detection member.

Still a further object of the present invention is to provide a credit card security device which is wallet size and lightweight.

Yet a further object of the present invention is to provide a credit card security device which holds a plurality of cards.

Another object of the present invention is to provide a credit card security device which is easy to manufacture and inexpensive.

The foregoing objects are basically attained by providing a credit card security device which includes a case for storing the credit cards having an access door, a three-wheel combination lock fixed to the case which secures the credit cards within the case, a detection member within the case for determining an entry into the case when the door is locked and an invalidating member operated by the detection member within the case for invalidating the credit cards. The detection member comprises a normally open electrical circuit when the door is locked and includes a switch for providing a current flow to the invalidating means upon the entry. The invalidating member includes an electromagnet in the circuit, which upon being energized by the current flow, invalidates the credit cards for future use.

Other objects, advantages and salient features of the invention will become apparent from the following detailed description, which, taken in connection with the annexed drawings, discloses the invention.

BRIEF DESCRIPTION OF THE DRAWINGS

Referring now to the drawings which form a part of this original disclosure.

DETAILED DESCRIPTION

Figure 1:
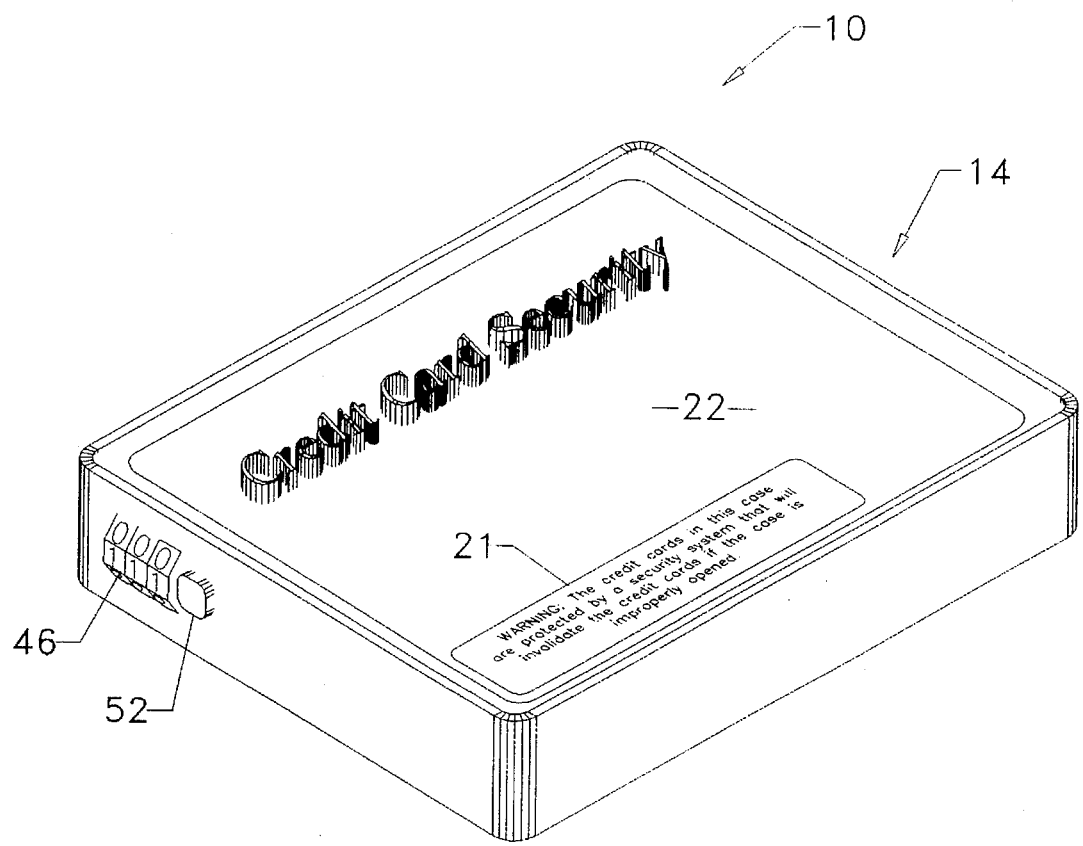
FIG. 1 is a side perspective view of the credit card security device in accordance with the present invention.
Figure 2:
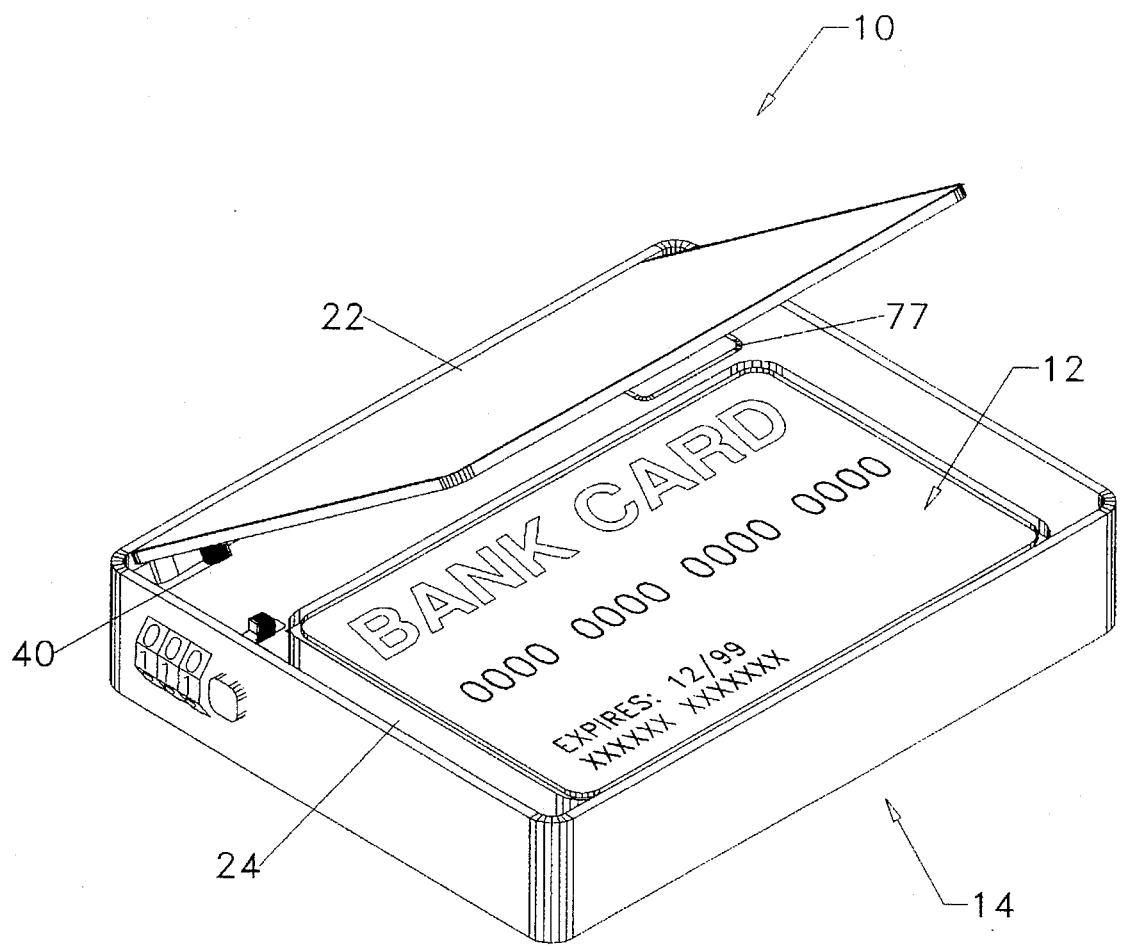
FIG. 2 is a side perspective view of the credit card security device of FIG. 1 showing the hinged access door of the case in its open position and credit cards within the case.
Figure 3:
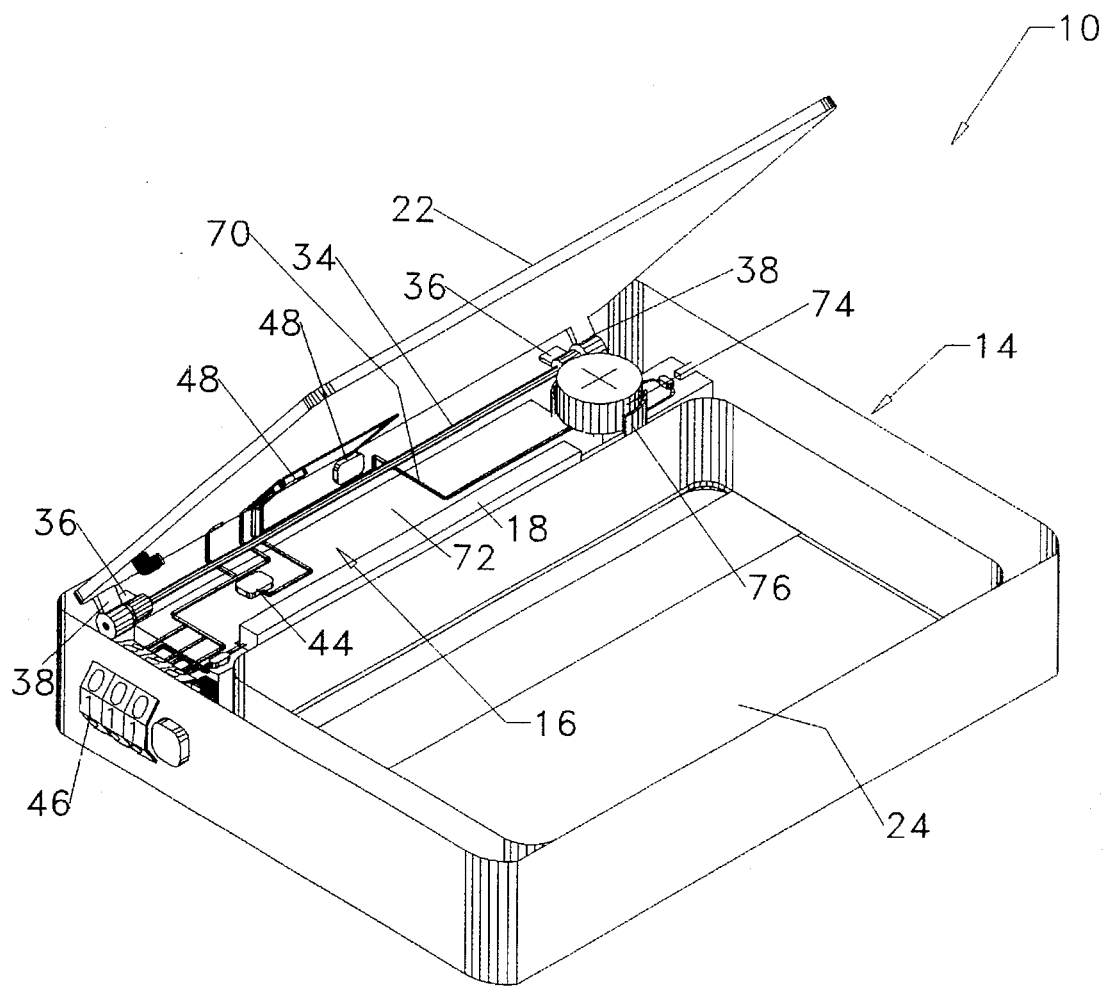
FIG. 3 is a side perspective view of the credit card security device of FIG. 1 showing the invalidation system therein.

As seen in FIGS. 1 and 2, a credit card security device 10 in accordance with the present invention is illustrated with credit cards 12 held within case 14. As seen in FIG. 3, credit card security device 10 also includes unauthorized entry detection mechanism 16 which is electrically connected to and activates invalidating electromagnet 18. Upon any unauthorized opening of case 14, unauthorized opening detection mechanism 16 activates electromagnet 18, which invalidates credit cards 12 by scrambling the code within each card's magnetic strip. It should be understood that although only credit cards are referred to throughout this description, security device 10 protects any type of card using magnetic strips as validating means, such as bank cards.

Figure 8:
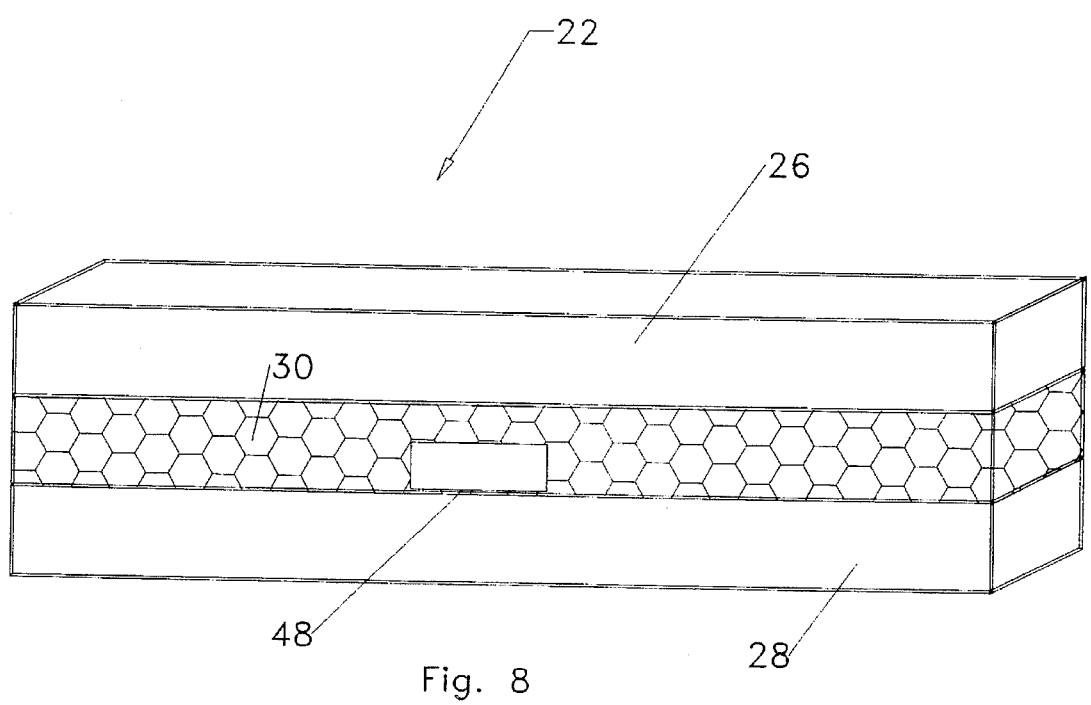
FIG. 8 is a front perspective view of the case's access door on an enlarged scale.

Case 14 is box-like and preferably wallet size with a warning 21 on the case's outside surface as seen in FIG. 1. Case 14 includes a top access door 22 and a credit card compartment or chamber 24 therein which is capable of storing up to ten credit cards, as seen in FIG. 2. The walls of case 14, including the sides and top and bottom, are formed of a three-layer paneling, as seen in FIG. 8. The outer and inner layers 26 and 28, respectively, are formed of solid metal or plastic. Middle layer 30 is sandwiched between outer and inner layers 26 and 28 and is formed of a honeycomb or similar structure capable of holding a charge of compressed air or other gas.

Figure 4:
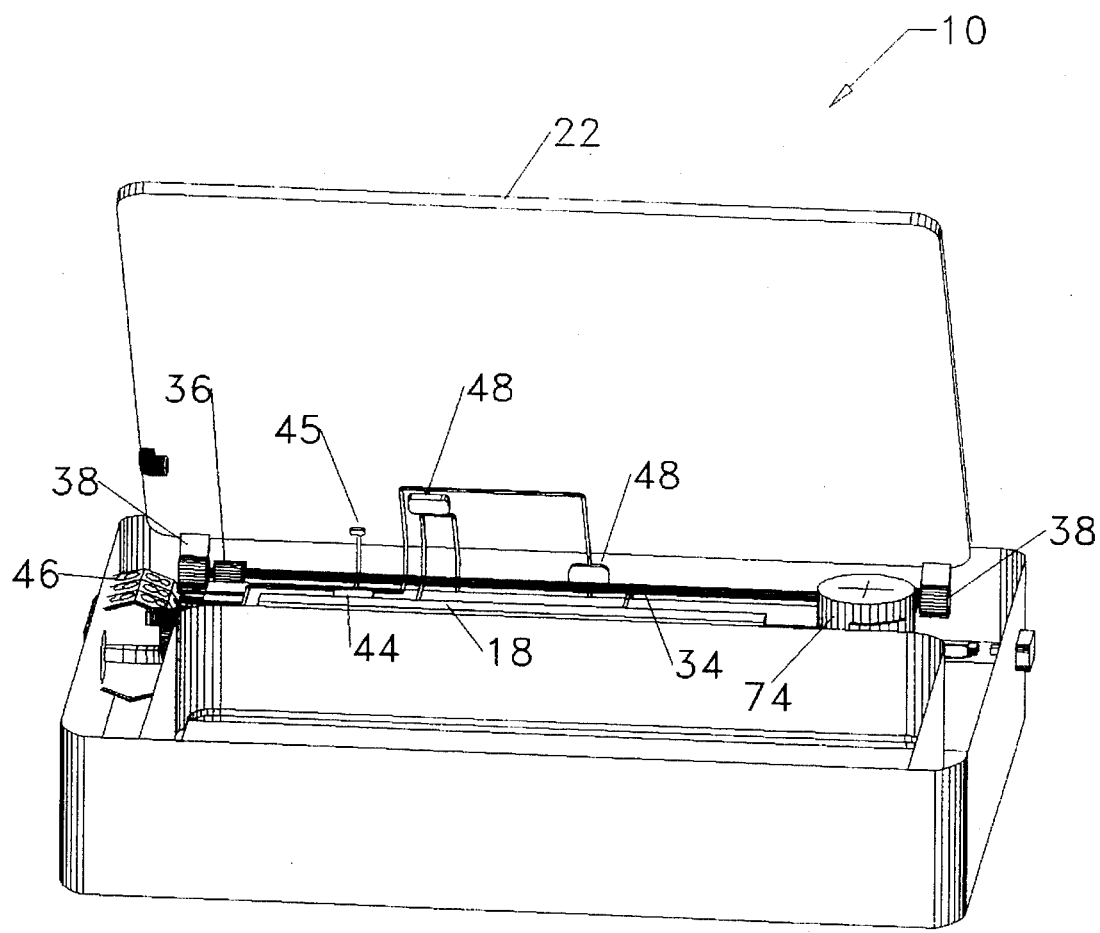
FIG. 4 is a front perspective view of the credit card security device of FIG. 1 showing the invalidation system thereof.
Figure 5:
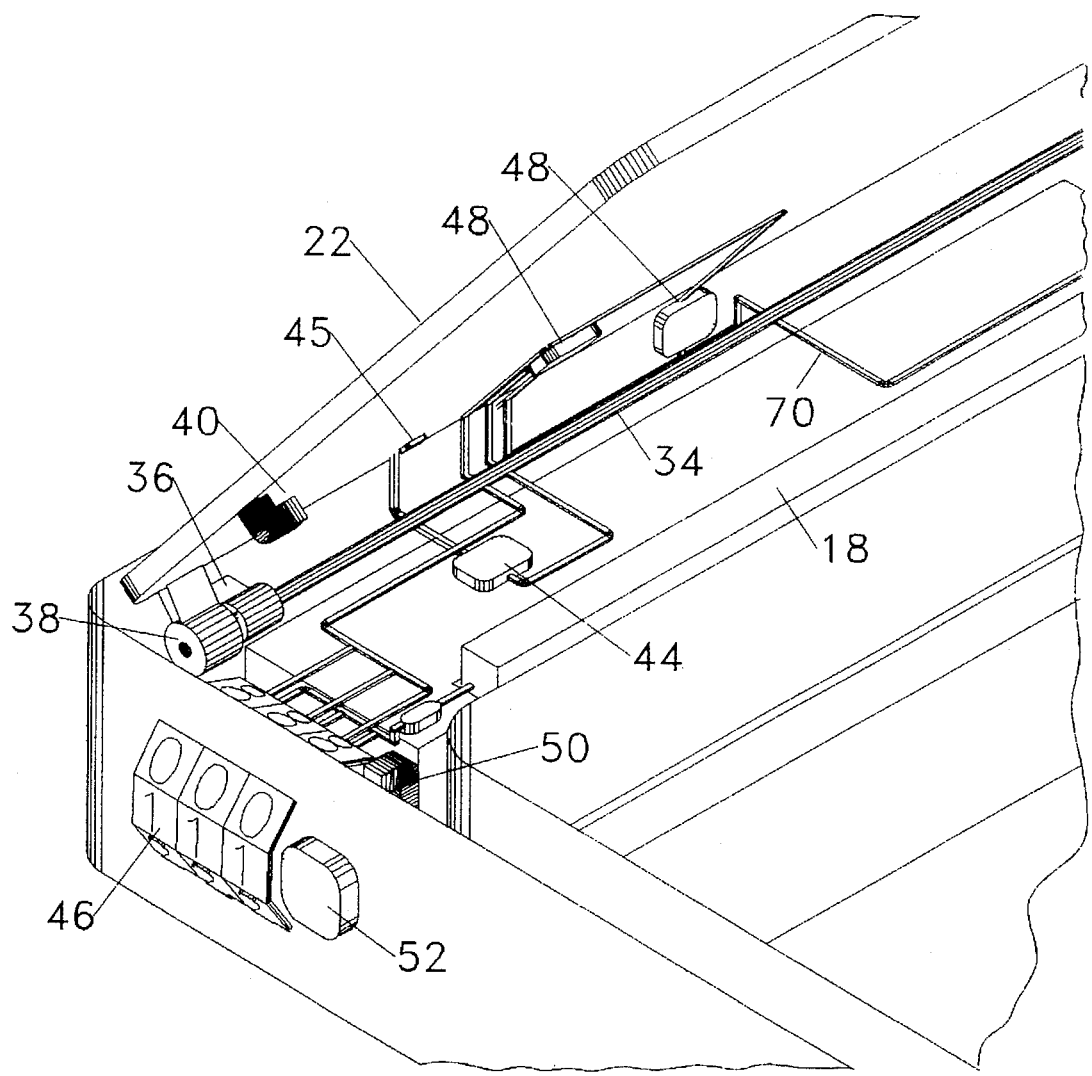
FIG. 5 is a fragmentary side perspective view of the credit card security device of FIG. 1, on an enlarged scale, showing the lock, unauthorized entry switch and pressure switches in detail.

Access door 22 pivotally moves between a closed, secured position, as in FIG. 1, and an open position which provides easy insertion and removal of credit cards 12, as seen in FIG. 2. Access door 22 is flush with the top surface of case 14 when in its closed position. Access door 22 is hingedly coupled to case 14 by rotator bar 34, as seen in FIGS. 3–5, and pivots or rotates between its positions. Rotator bar 34 is rotatably coupled within case 14 and extends substantially across the length of case 14. Each end of rotator bar 34 extends through a case attachment device 36 and into an access door attachment device 38. Case attachment devices 36 extend into the interior of case 14 from the rear sidewall of case 14, and access door attachment devices 38 extend downwardly into the interior of case 14 from the rear of the bottom surface of access door 22. Access door 22 also has a latch 40, as seen in FIG. 5, which extends downwardly from one side of the bottom surface of access door 22 and upon engagement with release 50 locks access door 22 in its closed position.

Unauthorized entry detection mechanism 16 includes an unauthorized entry switch 44 electrically connected to a lock 46, as best seen in FIGS. 3–5, and pressure change detection switches 48, as seen in FIG. 8. Unauthorized entry switch 44 is controlled by the opening and closing of access door 22 via depending contact 45, as seen in FIGS. 4–5. Switch 44 opens and remains open when the access door 22 is closed as switch 44 and contact 45 are urged one towards the other. Switch 44 closes when the access door 22 is opened as depending contact 45 is displaced from switch 44.

Figure 7:
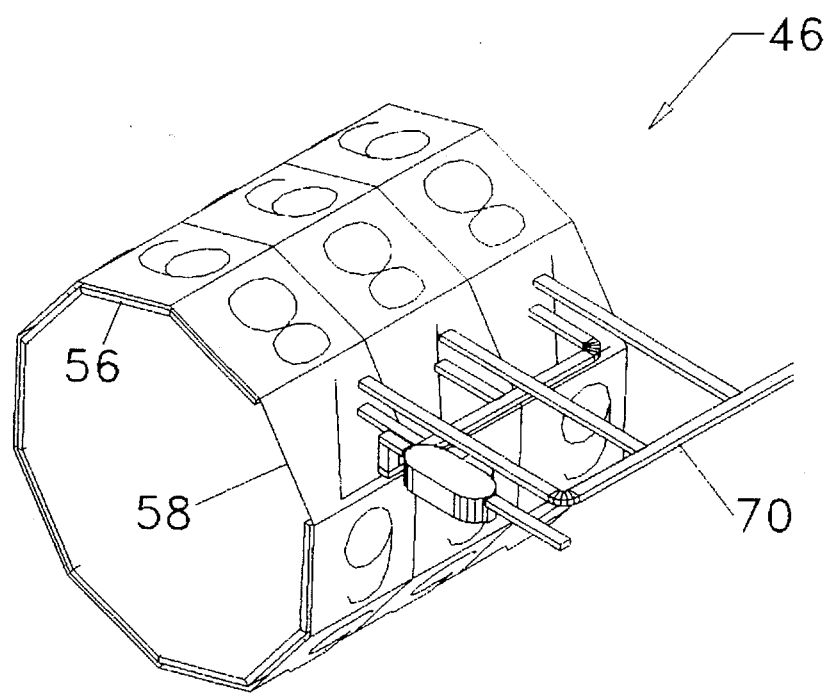
FIG. 7 is a side perspective view of the lock in detail on an enlarged scale.
Figure 9:
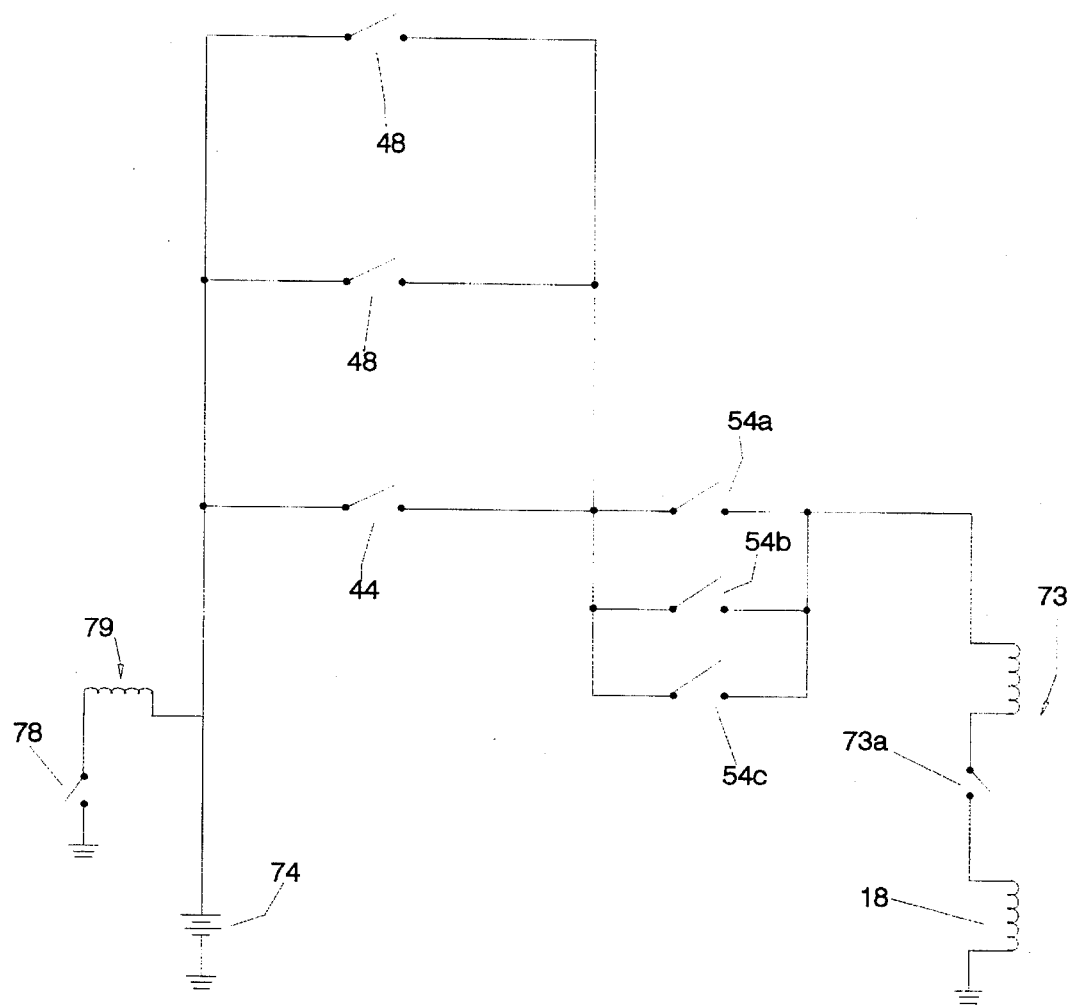
FIG. 9 is a schematic for the electrical circuit of the credit card security device of FIG. 1.

Lock 46 is preferably a three-wheel, ten digit per wheel combination lock mounted within a sidewall of case 14 so that lock 46 can be operated from the exterior of case 14. Such a lock 46 is of a type found in briefcases/attaches. Lock includes a latch release 50, which is operated by push button 52 upon the preset combination being displayed exterior of the case, "111" as seen in FIG. 5. Latch release 50 interconnects with latch 40 when access door 22 is in its closed position thereby preventing unauthorized entry into case 14. Each of the three wheels of lock 46, as best seen in FIG. 7, acts as authorized entry switches 54a, 54b and 54c, as in FIG. 9. Each wheel has a conductive inner layer 56 behind every numbered section on the wheel, except one. The location of the nonconductive layer is preset and should be opposite the exterior combination of numbers which will open the case. Each switch is open only when the corresponding wheel is aligned so that the nonconductive section 58 is in contact with the circuit wiring 70, as illustrated in FIG. 7. Thus, when the correct combination of numbers is utilized to open the case 14, the three switches 54a, 54b and 54c will be open so as to prevent the energization of the electromagnet 18 and invalidation of the credit cards 12 therein. (FIG. 9).

A pressure change detection switch 48 is shown as mounted within middle layer 30 of access door 22, as seen in FIG. 8, and another pressure change detection switch (not shown) is mounted within middle layer 30 of the rear sidewall of case 14. Pressure change detection switches 48 are activated by a pressure change in the honeycomb structure 30 due to pressure release of the gas or liquid within the middle layer 30 of case 14, the release caused by penetration of an object into the respective case wall. The switches 48 remain open while the middle layer 30 of case 14 is pressurized and close when the pressure is released from the honeycomb layer 30. Pressure switches 48 are similar to those mounted between two panes of glass used in window mounted security systems.

Figure 6:
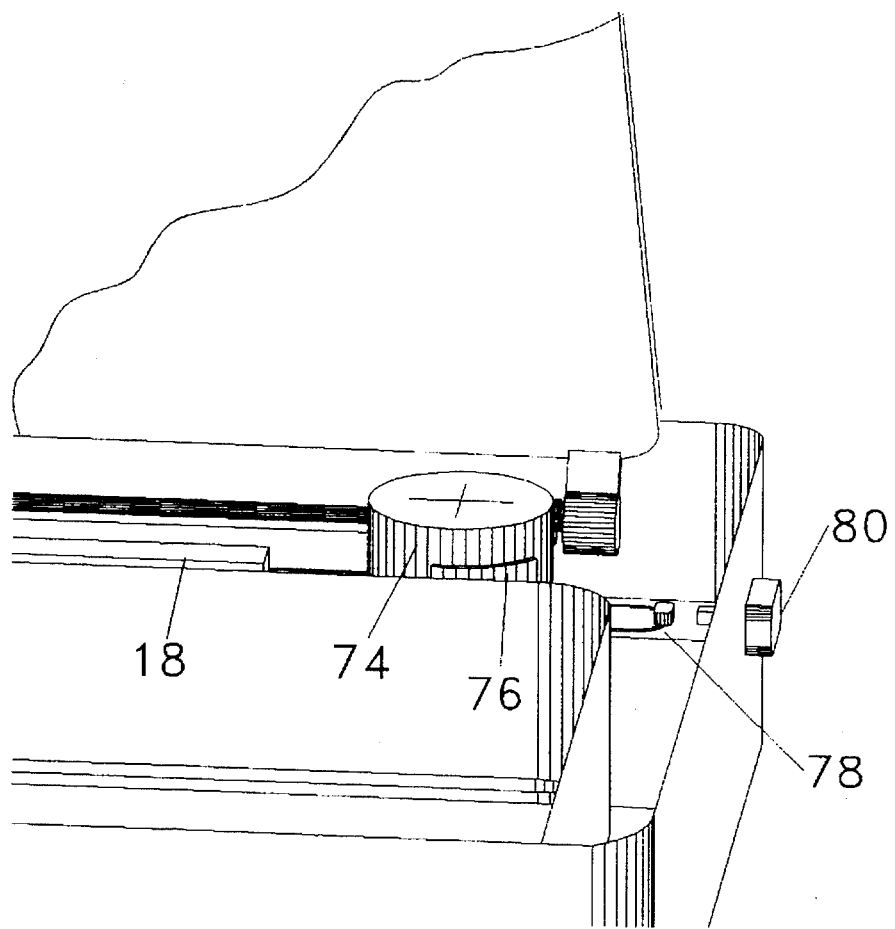
FIG. 6 is a fragmentary front perspective view of the credit card security device of FIG. 1, on an enlarged scale, showing the battery thereof.

Power to electromagnet 18 is supplied by battery 74 via a relay 73 which will be energized to close relay contact 73a by a current flow through either the closed unauthorized entry switch 44 or pressure change detection switches 48 and through one of the lock 46 switches 54a, 54b or 54c. Electromagnet 18 is mounted within case 14 preferably between the credit card compartment 24 and the rear sidewall of case 14. The relay 73 delivers the current to electromagnet 18 in a pulsating manner to strengthen the magnetic field produced by electromagnet 18. Battery 74 is held in place by battery holder 76, as seen in FIGS. 3 and 6, and battery access door 77, as seen in FIG. 2.

Pressure on button 80 will close battery indicator switch 78. A battery indicator light 79 within push button 80 will illuminate button 80 when battery 74 is good. The button is preferably mounted within and extends through the side wall of case 14 opposite lock 46 so that it can be seen and operated from the exterior of case 14, as seen in FIG. 6.

OPERATION

With case 14 closed and latched, as in FIG. 1, unauthorized entry switch 44 and pressure switches 48 are open thereby preventing current flow through the circuit and the invalidation of credit cards 12 by electromagnet 18. One or all of the authorized entry switches 54 of lock 46 are closed with case 14 closed and the opening combination not set. When the proper combination is selected by rotating each wheel of lock 46, authorized entry switches 54 of lock 46 are opened allowing access door 22 of case 14 to be opened for authorized entry into case 14. Although unauthorized entry switch 44 closes when access door 22 is opened, credit cards 12 are not invalidated since the proper combination on lock 46 opens all the authorized entry switches 54a, 54b, 54c of lock 46 thereby precluding current flow to electromagnet 18. For insertion or removal of credit cards 12, case 14 is opened by pushing button 52 inwardly which, in turn, moves release 50 inwardly and dislodges latch 40 and release 50.

If case 14 is lost or stolen, the case 14 must be tampered with or broken into for the credit cards to be invalidated if the correct combination is not set. Assuming that the combination is not turned to the proper sequence of numbers, one or all of switches 54a, 54b or 54c will be closed. Thus, as the case 14 is locked, forced entry is required. If the cover 22 is pried open, contact 45 closes switch 44 and current will flow through switch 44 and through at least one of switches 54a, 54b or 54c to the electromagnet 18. If the walls of the case are punctured, current will flow through the closed pressure detection switches 48. As one or all of the entry switches 54 of lock 46 are closed, the current will flow to the electromagnet 18. The magnetic energy charge produced by electromagnet 18 scrambles the code within each credit card's magnetic strip located on the back of each credit card 12 which in the adjacent credit card compartment 24, thereby invalidating the credit cards 12.

To reiterate, when access door 22 is forcibly opened without authorization and the proper use of the combination lock 46, the conductive layer 56 of at least one wheel of lock 46 contacts wiring 70 so that at least one of the authorized entry switches 54 of lock 46 remains closed. The unauthorized entry switch 44 also closes upon door 22 opening which closes the electromagnet circuit, thereby activating the electromagnet 18 and invalidating the credit cards 12.

Also, if the case 14 is tampered with and the middle layer 30 of the case walls are pierced or broken, the pressurized air or other gas contained in the middle layer 30 is released causing the pressure of the middle layer 30 to drop and pressure switches 48 to close. This causes a current flow through the circuit (see FIG. 9), and the credit cards 12 are invalidated by electromagnet 18.

When the low battery light 79 and button 80 is pushed inwardly, it contacts the low battery indicator mechanism 78 of the electromagnetic circuitry and powers the light 79. Available power in the battery 74 is determined by the intensity of the light 79. If the light 79 is very dim or not present upon testing, a new battery 74 is needed. Battery holder 76 and sliding battery access door 77 located inside case 14 next to the credit card compartment 24 facilitates easy changing of battery 74 as needed.

While the most advantageous embodiment has been chosen illustrate the invention, it will be understood by those skilled in the art that various changes and modifications can be made therein without departing from the scope of the invention as defined in the appended claims. For instance, the credit card security device can be modified to use the same electrical system to activate other means of invalidating or destroying the enclosed credit cards such as chemical, electro-mechanical devices, or heat release systems, as opposed to the magnetic deactivation system.

Having thus described the invention, what is claimed as new and desired to be secured by Letters Patent is as follows:

1. A credit card security device, comprising:

a case having an access door for storing credit cards, locking means for releasably locking said door to secure the credit cards therein, detection means within said case for determining an entry into said case when said door is locked, invalidating means within said case for invalidating the credit cards, said detection means operating said invalidating means upon said entry, said detection means comprising:

a normally open electrical circuit for providing a current flow to operate said invalidating means:

switch means in said circuit and in at least one wall of said case for providing said current flow through said circuit to operate said invalidating means upon said entry, said switch means being normally open to preclude said current flow and closes upon said entry to said case through said wall, whereby to provide said current flow.

2. A device as claimed in claim 1, wherein said locking means comprises a combination lock for operating an access door release.

3. A device as claimed in claim 2, further comprising a first switch in said detection means circuit and a first associated with said combination lock, said first switch associated with said lock being open when said combination lock is unlocked and closed when said combination lock is locked, said open first switch precluding said current flow through said circuit upon said entry, said closed first switch allowing for said current flow through said circuit upon said entry.

4. A device as claimed in claim 3, wherein said lock includes a non-conductive surface in said circuit which causes said first switch to open said circuit when said combination lock is unlocked and a conductive surface which causes said first switch to close upon said combination lock being locked.

5. A device as claimed in claim 3, further comprising a second switch in said circuit operably connected to said access door, said second door switch being open upon closure of said door and closed upon opening of said door, said closed second door switch cooperating with said first closed lock switch for providing a current flow through said circuit when said access door is open and said combination lock is locked.

6. A device as claimed in claim 1, wherein said wall surrounding said switch means comprises at least a resilient layer of material surrounding said switch means in said wall, said material having a first normal mode and a second mode upon said entry through said wall, said second mode causing a closure of said switch means.

7. A device as claimed in claim 6, wherein said resilient layer includes a layer of honeycomb material surrounding said switch means, said honeycomb being pressurized in said first normal mode and depressurized in said second mode, said depressurized honeycomb material allowing for a closure of said surrounded switch means whereby to provide said current flow.

8. A device as claimed in claim 1, wherein said invalidating means includes an electromagnet in said circuit, said current flow energizing said electromagnet for invalidating the credit cards within said case.

9. A credit card security device, comprising:

a case for storing a plurality of credit cards having an access door, a lock to secure said case, a circuit for providing a current flow to an electromagnet upon an entry into said case when said door is locked, and said electromagnet rendering the cards invalid for future use upon receiving said current flow, said circuit including a normally open pressure change detection member within a wall of said case, which closes said circuit when said entry into said case is through said wall whereby to provide said current flow.

10. A credit card security device as claimed in claim 9, wherein said circuit includes a sensor associated with said lock, said sensor being closed when said lock is locked whereby to provide said current flow.

11. A device as claimed in claim 9, wherein said pressure change detection member includes a layer of resilient material under pressure within said wall and surrounding a normally open switch in said circuit, said entry causing a depressurization of said resilient material allowing for a closing of said switch and said closing of said circuit.

12. A credit card security device, comprising:

a case for storing credit cards having an access door, a lock to secure said case, a detection member within said case for determining an entry into said case when said door is locked comprising a normally open electrical circuit when said door is locked, and an invalidating member within said case and in said circuit for invalidating the credit cards, said detection member operating said invalidating member upon said entry and including a switch member for providing a circuit current flow to said invalidating member upon said entry, said switch member including a first sensor associated with said lock, said first sensor being closed when said lock is locked, said switch member including a second sensor operably connected to said access door, said second sensor being open upon closure of said door and closed upon opening of said door whereby to provide said current flow through said circuit when said door is open and said lock is locked, said switch member further including a pressure switch mounted in at least one wall of said case, said pressure switch being in a normally open position and closing when said entry into said case is through said wall whereby to provide said current flow, said lock including a non-conductive surface which causes said first sensor to open when said lock is unlocked and a conductive surface which causes said first sensor to close when said lock is locked, said invalidating member including an electromagnet in said circuit, said current flow energizing said electromagnet for invalidating the credit cards within said case.

* * * * *

UNITED STATES PATENT AND TRADEMARK OFFICE
CERTIFICATE OF CORRECTION

PATENT NO. : 5,598,792
DATED : February 4, 1997
INVENTOR(S) : Forrest A. Wales

It is certified that error appears in the above-indentified patent and that said Letters Patent is hereby corrected as shown below:

Column 5, line 30, delete "a first".

Signed and Sealed this

Twenty-fourth Day of June, 1997

Attest:

BRUCE LEHMAN

Attesting Officer

Commissioner of Patents and Trademarks